US009056558B2

(12) United States Patent
Zimmerman et al.

(10) Patent No.: US 9,056,558 B2
(45) Date of Patent: Jun. 16, 2015

(54) OVERHEAD POWER GRID FOR MOBILE MINING MACHINES

(71) Applicant: Joy MM Delaware, Inc., Wilmington, DE (US)

(72) Inventors: Joseph J. Zimmerman, Franklin, PA (US); Garrett L. Lowman, Polk, PA (US); Andrew W. Struthers, Jackson Center, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 175 days.

(21) Appl. No.: 13/755,239

(22) Filed: Jan. 31, 2013

(65) Prior Publication Data

US 2013/0192944 A1    Aug. 1, 2013

Related U.S. Application Data

(60) Provisional application No. 61/593,073, filed on Jan. 31, 2012.

(51) Int. Cl.
*B60M 1/18* (2006.01)
*B60M 1/14* (2006.01)
(Continued)

(52) U.S. Cl.
CPC .. *B60M 1/14* (2013.01); *B60L 5/36* (2013.01); *B60M 1/12* (2013.01); *B60L 2200/26* (2013.01)

(58) Field of Classification Search
CPC ............ B60M 1/14; B60M 1/12; B60M 3/06; B60L 5/36; B60L 5/12; B60L 5/19; B60L 5/14; B60L 7/10; B60L 7/00; B60L 9/18

USPC ........... 191/33 R, 45 R, 38, 50, 51, 52, 41, 55
See application file for complete search history.

(56) References Cited

U.S. PATENT DOCUMENTS 1,366,142 A * 1/1921 Wilson ............................ 191/50
2,625,344 A * 1/1953 Flansburgh ................... 242/128
(Continued)

FOREIGN PATENT DOCUMENTS

GB    2075449    11/1981
PL    92795    5/1991
(Continued)

OTHER PUBLICATIONS

Examination Report from the Intellectual Property Office of Great Britain for British Application No. GB1301612.6 dated Jun. 23, 2014 (3 pages).
(Continued)

*Primary Examiner* — Jason C Smith
(74) *Attorney, Agent, or Firm* — Michael Best & Friedrich LLP (57) ABSTRACT

A vehicle is provided that connects to an overhead power structure for powering and guiding the vehicle. The overhead power structure includes a trolley, a track along which the trolley runs, a power source connected to the track, and a cable connected to the trolley and configured to attach to the vehicle moving on a surface. The vehicle includes a chassis and a cable connected to the chassis and configured to mechanically and electrically connect the vehicle to the overhead power structure. The chassis includes a connector rotatable 360 degrees, and the cable connects to the chassis through the connector.

24 Claims, 12 Drawing Sheets

(51) Int. Cl.
*B60L 5/36* (2006.01)
*B60M 1/12* (2006.01)

(56) References Cited

U.S. PATENT DOCUMENTS

| | | | | |
|---|---|---|---|---|
| 3,632,906 | A * | 1/1972 | Aihara | 191/12.2 A |
| 4,338,498 | A * | 7/1982 | Murphy | 191/66 |
| 4,700,023 | A * | 10/1987 | Hillmann et al. | 191/12.2 A |
| 4,791,871 | A * | 12/1988 | Mowll | 104/94 |
| 4,878,607 | A * | 11/1989 | Lessard | 226/24 |
| 5,297,661 | A * | 3/1994 | Tschurbanoff | 191/38 |
| 6,193,035 | B1 * | 2/2001 | Conrad | 191/64 |
| 8,583,303 | B2 * | 11/2013 | Bastien | 701/22 |
| 2008/0282583 | A1 * | 11/2008 | Koellner et al. | 37/348 |
| 2011/0094841 | A1 * | 4/2011 | Mazumdar et al. | 191/33 R |
| 2012/0175209 | A1 * | 7/2012 | Mazumdar et al. | 191/2 |
| 2013/0192944 | A1 * | 8/2013 | Zimmerman et al. | 191/38 |
| 2014/0032028 | A1 * | 1/2014 | Saito et al. | 701/22 |

FOREIGN PATENT DOCUMENTS

| | | |
|---|---|---|
| PL | 331697 | 3/1998 |
| PL | 384144 | 12/2007 |
| WO | 9117905 | 11/1991 |

OTHER PUBLICATIONS

Examination Report from the Intellectual Property Office of Australia for Australian Application No. 2013200541 dated Jul. 11, 2014 (3 pages).

GB1301612.6 United Kingdom Search Report dated May 28, 2013 (5 pages).

P402607 Search Report from the Patent Office of the Republic of Poland dated Jun. 12, 2013 (2 pages).

Australian Patent Examination Report No. 1 for Application No. 2013200541 dated Jun. 24, 2013 (6 pages).

* cited by examiner

OVERHEAD POWER GRID FOR MOBILE MINING MACHINES

CROSS-REFERENCE TO RELATED APPLICATIONS

The present application claims priority to U.S. Provisional Application No. 61/593,073, filed Jan. 31, 2012, the entire contents and disclosure of which are incorporated by reference herein.

BACKGROUND

The present invention relates to movable electric machinery, and, more particularly, to an overhead power grid connected to the movable electric machinery.

Heavy mining machinery used in surface mining and underground "hard rock" mining is typically powered by diesel engines. There has long been a need to reduce the health risks associated with operating such diesel engines in confined surface and underground mining applications. Specifically, diesel engines emit particulate matter harmful to humans, create high noise levels, and add significantly to the "heat loading" in an underground mine. Additionally, the high cost of diesel fuel and diesel engine maintenance present additional downsides.

Conventional overhead grid powered systems, such as rail transportation systems, use pantographs that slide on an overhead wire. These systems require the use of rail based guidance to keep the movable machine (locomotive) within an acceptable proximity to the overhead wires (conductors). Pantograph systems have been attempted to be implemented with haul trucks, but such pantograph systems do not include any "switching" means to switch the direction of travel along the roadway or rail other than lowering the pantograph, going back on diesel power to make the turn, and then re-engaging the pantograph to get back on overhead power.

SUMMARY

According to an embodiment of the invention, an overhead power structure is provided for powering and guiding a vehicle. The overhead power structure includes a trolley, a plurality of generally tubular and parallel segments forming a track along which the trolley runs, a power source connected to the tubular segments, and a cable connected to the trolley and configured to attach to a vehicle moving on a surface. The cable mechanically and electrically connects the vehicle to the trolley.

According to another embodiment of the invention, a vehicle is configured to connect to an overhead power structure. The vehicle includes a chassis and a cable connected to the chassis and configured to mechanically and electrically connect the vehicle to the overhead power structure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

Figure 1:
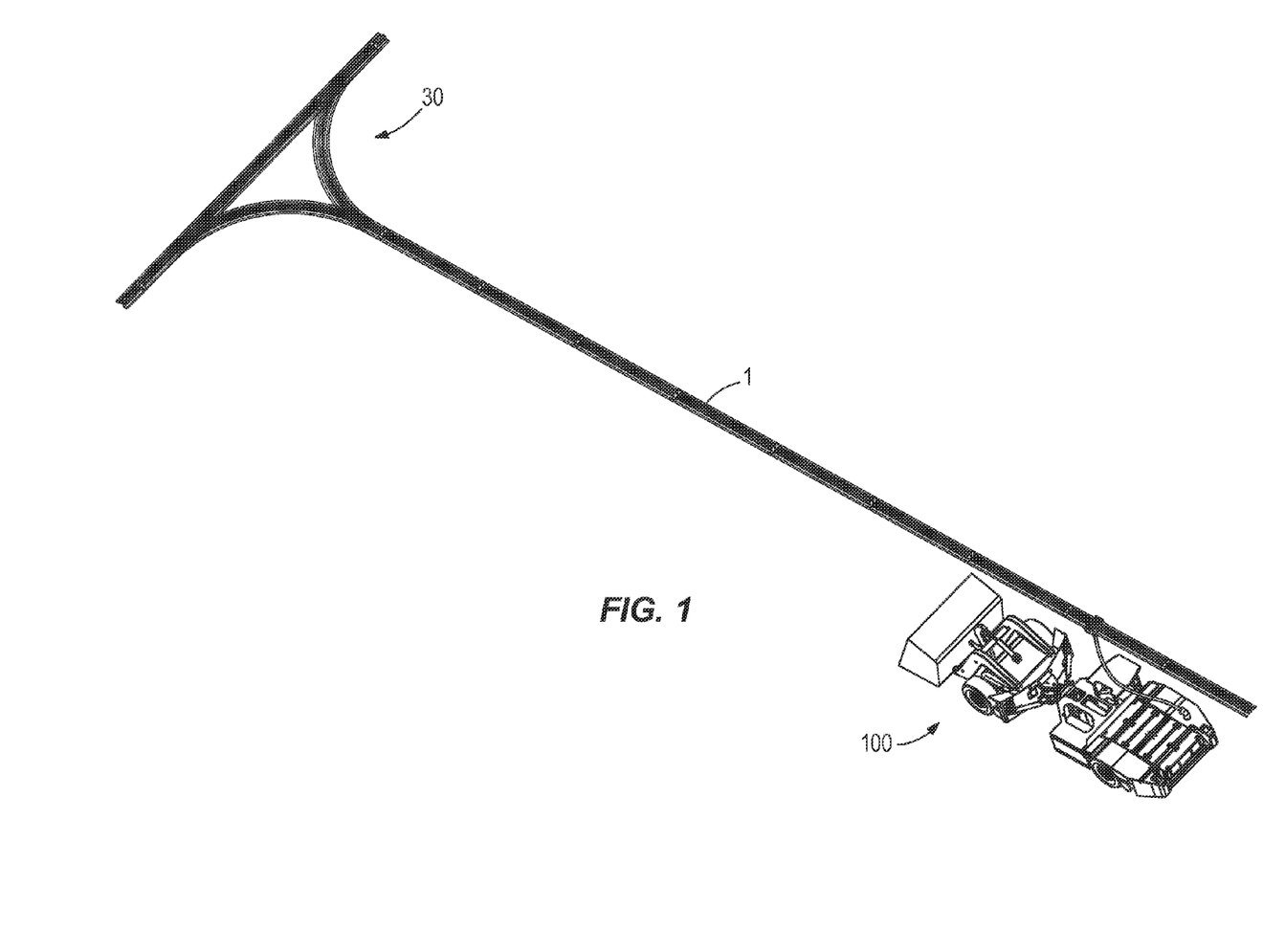
FIG. 1 is a top perspective view of a mobile mining machine connected to an overhead power grid according to an embodiment of the invention.
Figure 2A:
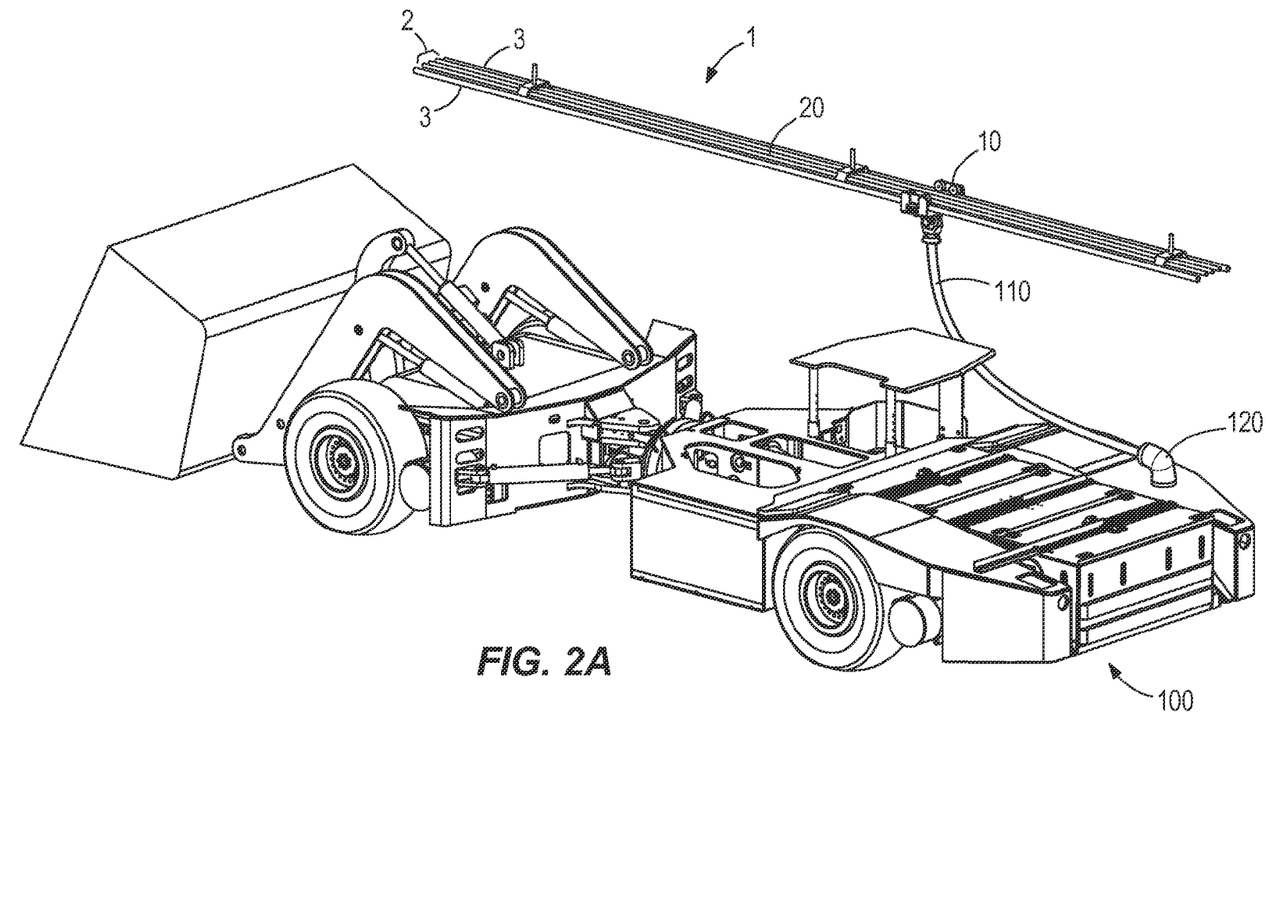
FIG. 2A is a partial right side perspective view of the mobile mining machine connected to the overhead power grid of FIG. 1.
Figure 2B:
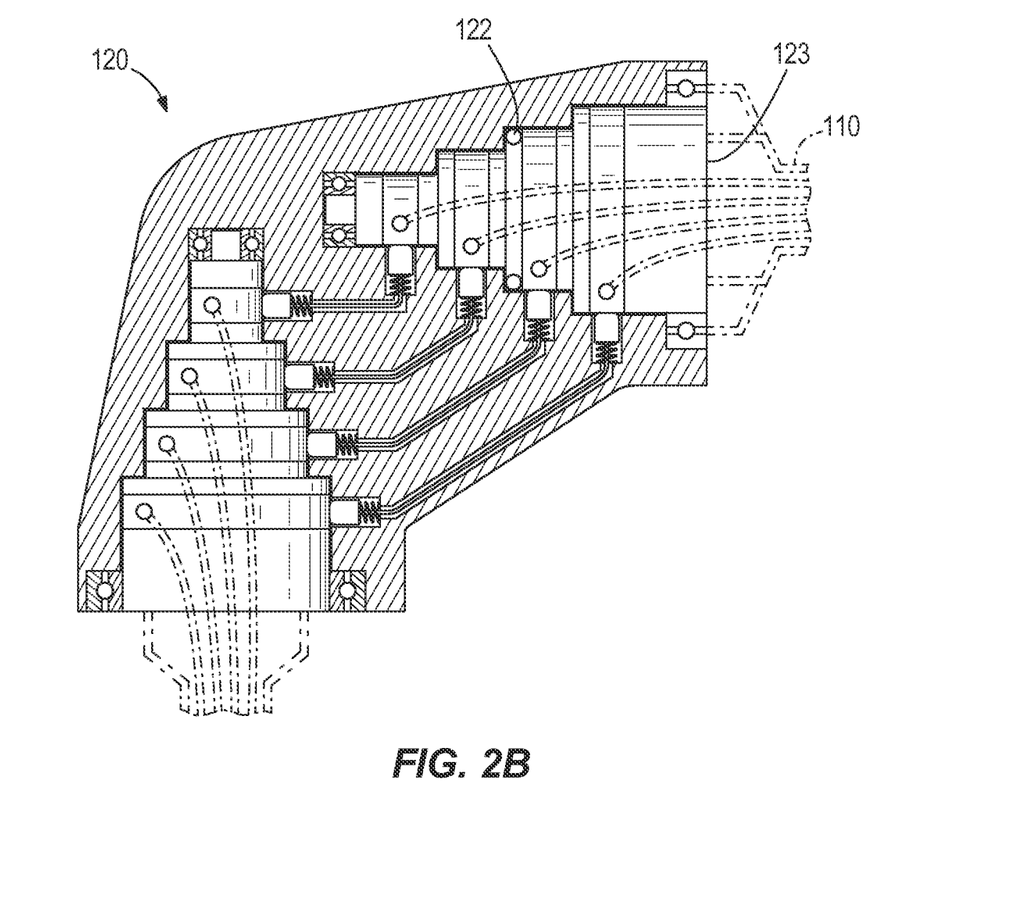
FIG. 2B is a plan view of a special connector for the mobile mining machine of FIG. 1.
Figure 2C:
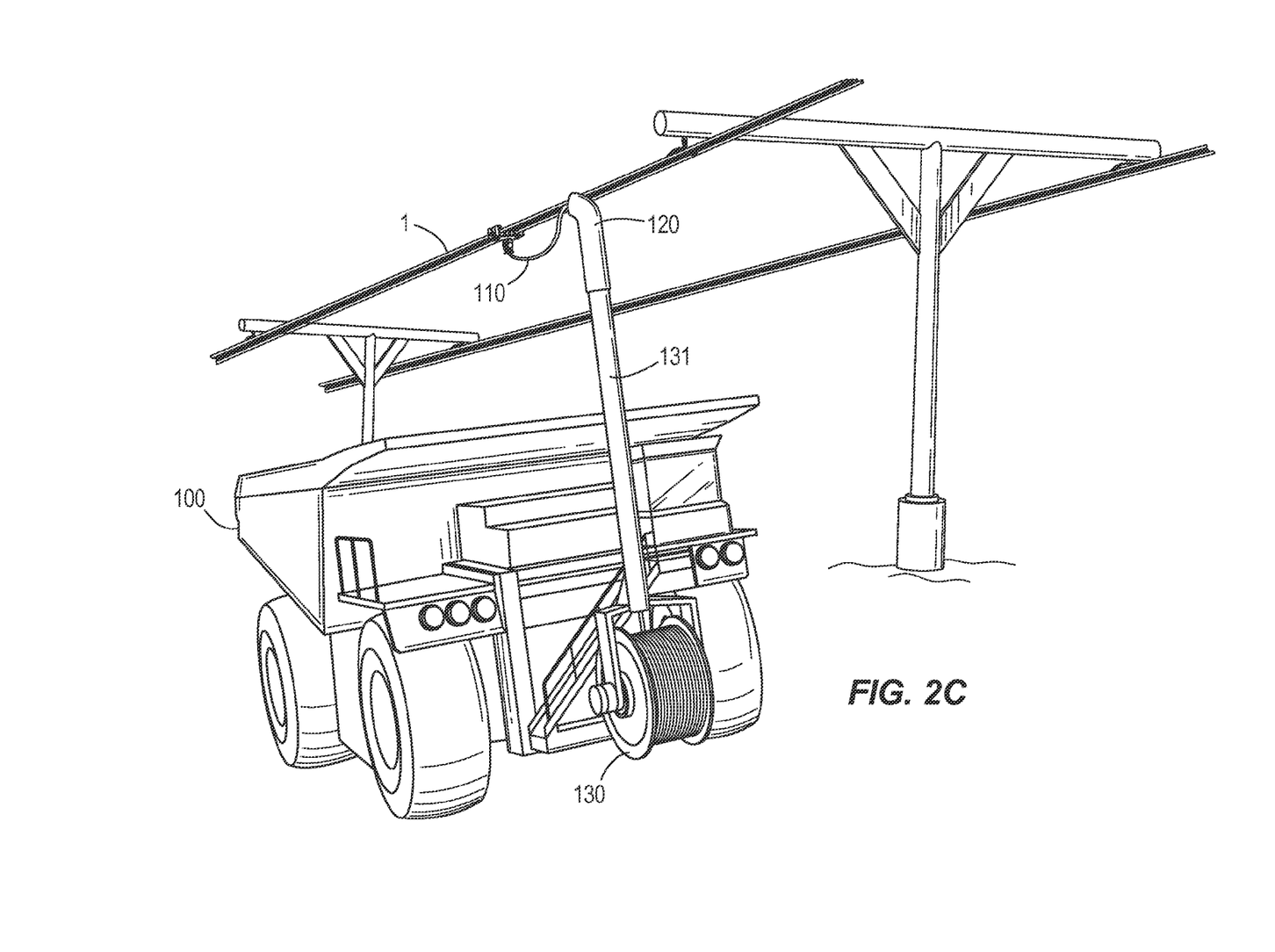
FIG. 2C is a perspective view of an alternative embodiment of the mobile mining machine.

FIGS. 1 and 2 illustrate a mobile mining machine 100 (such as a load-haul-dump vehicle, hereinafter "LHD") mining operations. The LHD 100 is electrically and mechanically connected to an overhead power structure 1 via a trolley 10. The overhead power structure 1 may be a free standing structure or may be suspended from a ceiling of a mine.

Figure 3A:
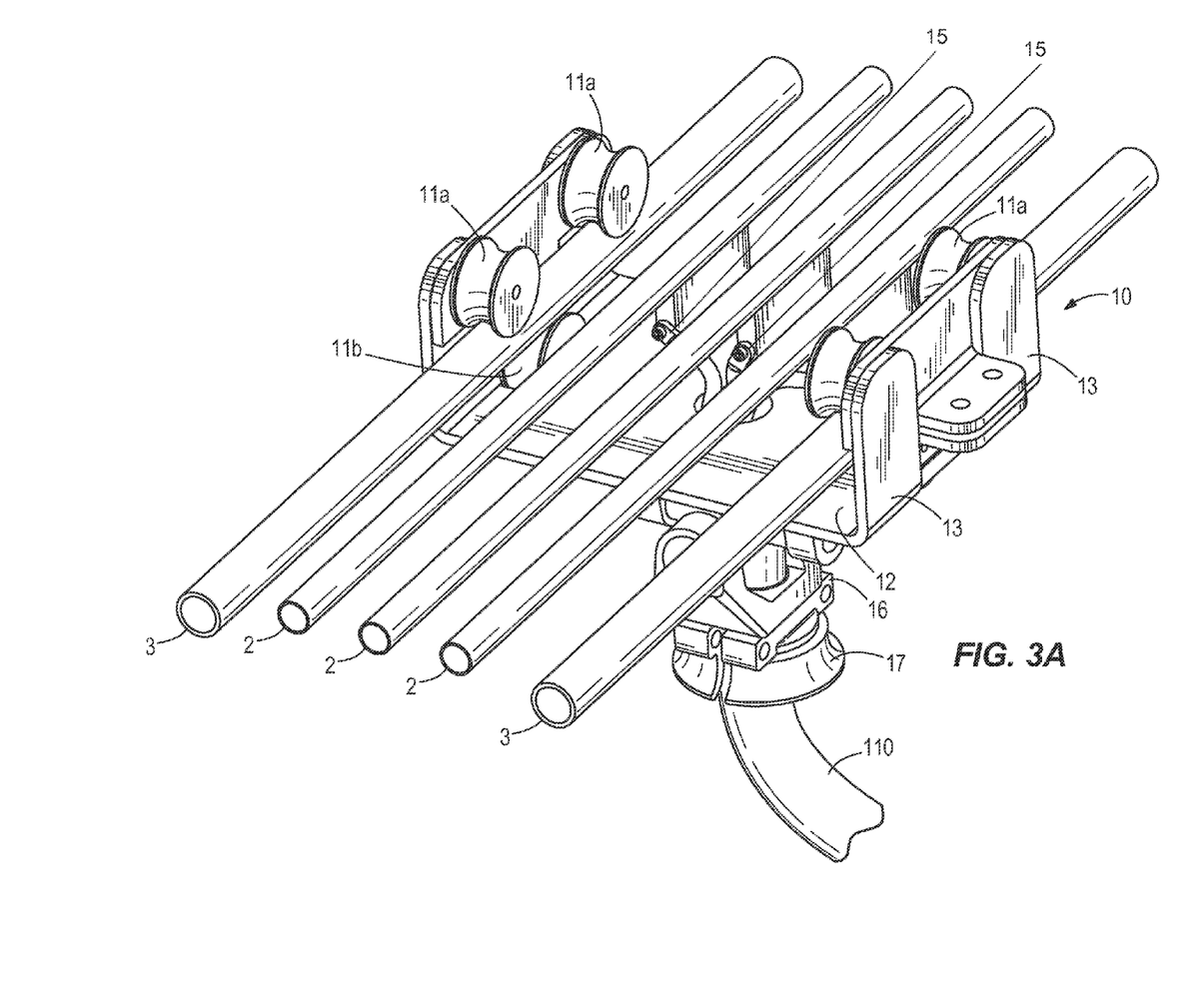
FIG. 3A is a perspective view of a trolley for the overhead power grid according to an embodiment of the invention.
Figure 3B:
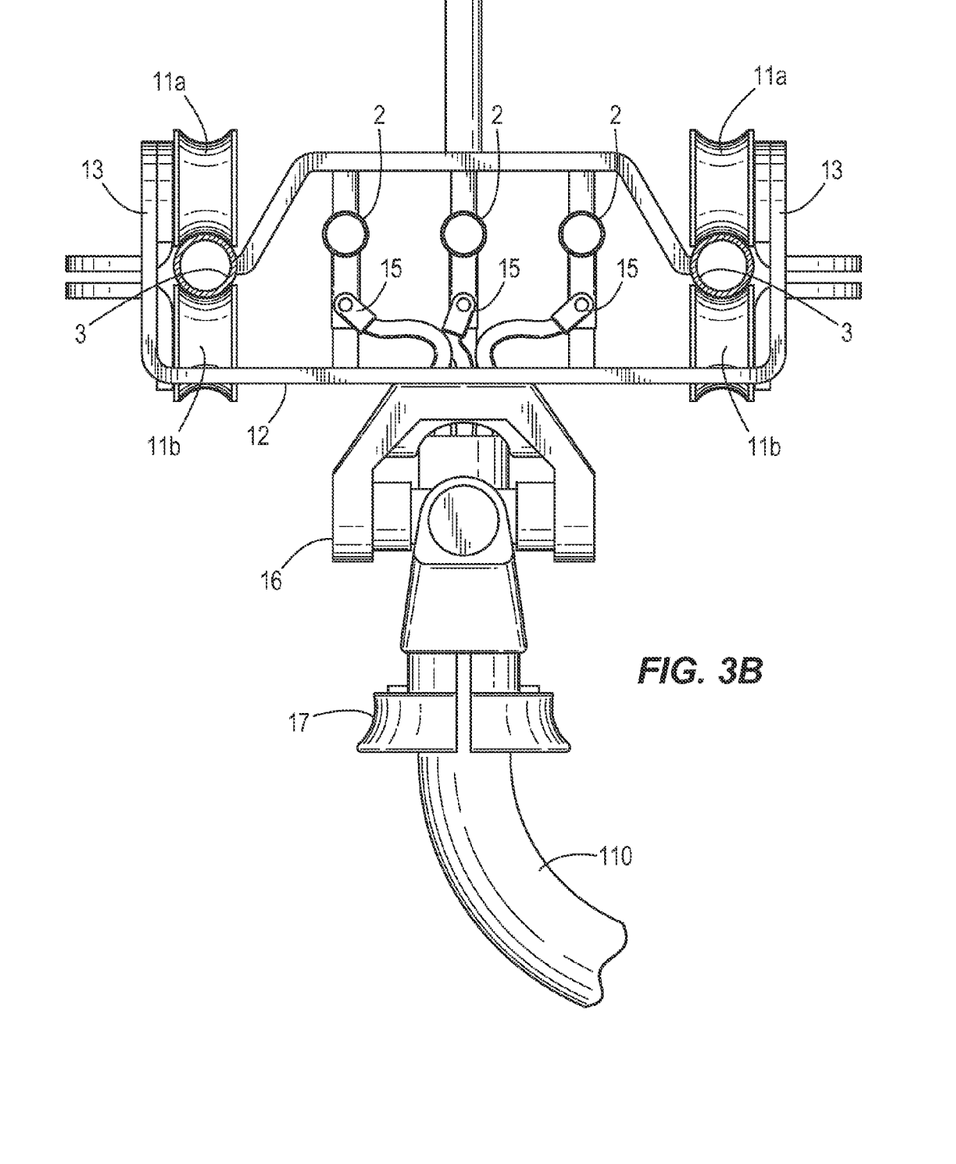
FIG. 3B is a plan view of FIG. 3A.

As shown in FIGS. 2A and 3, the overhead power structure 1 includes a plurality of generally tubular conductors 2 and rail segments 3. The outer tubes are rail segments 3 along which guide wheels 11 of the trolley 10 run, and the inner tubes are metallic conductor tubes 2 that form the conductors for a 3-phase AC power grid 20. The power grid 20 may be of multiple types, i.e. AC, DC, AC 3-phase, etc. The metallic conductor tubes 2 may be formed of copper or another conductive metal. The conductors 2 and rail segments 3 form a power grid structure 1 that is connected to the LHD 100 by a trailing cable 110.

As shown in FIGS. 2A and 3, the trailing cable 110 hangs down from the trolley 10 and connects the power from the power grid 20 to the LHD 100. The trailing cable 110, along with the associated trolley 10 and special connector 120 (further discussed below) on the LHD 100 keeps the ground or floor surface of the mine free of cables so other equipment can be more easily operated, especially other tetherless equipment.

As best viewed in FIG. 2B, the trailing cable 110 connects to the chassis 101 of the LHD 100 through a special connector 120 rotatable 360 degrees. The special connector 120 allows the trailing cable 110 to be safely removed without harm to the LHD 100, trolley 10, power structure 1, or mining personnel. The connector 120 includes a spring-loaded ball 121 that works in a detent 122 to hold the trailing cable 110 in a socket 123. However, with enough pull, the trailing cable 110 can be pulled out from the connector 120. The ability of the trailing cable 110 to easily release from the connector 120 is important in case the trolley 10 gets hung up, and to prevent pulling down the overhead grid segments 2, 3 in case the LHD 100 travels beyond the reach of the cable 110.

In an alternative embodiment, in addition to or instead of allowing the trailing cable 110 to release from the connector 120 in the event of a malfunction, the trolley 10 includes a control means to de-energize the power through the cable 110 to the LHD 100. The control means can include a circuit breaker, a control transformer, a contactor, a ground fault interrupter, or a logic controller mounted on the trolley. The control means may also include an angle or tension sensor that indicates a position or angle of the trailing cable 110 (i.e. that the cable 110 is not hanging substantially vertically or being pulled at some angle exceeding a pre-determined threshold angle). If the sensor determines the angle of the cable 110 exceeds the minimum threshold angle, the control means signals a cable reel 130 (further described below) to pay out additional cable 110 or signals the operator to apply the brakes to the LHD 100. If there is no cable reel 130 or if the cable 110 in the cable reel 130 has reached its maximum output, an additional ripcord may be attached between a chassis of the LHD 100 and a base of the trolley 10 to indicate that the cable 110 is at a maximum tension, thus altering the operator to apply the brakes. Additionally, the circuit breaker or a grounding circuit of the power structure 1 may cut off power to the grid 1 in the event of tension in the cable 110 reaching a second, higher threshold.

As shown in FIG. 2C and as discussed above, the LHD 100 may include a cable reel that stores the trailing cable 110. The presence of the cable reel 130 allows the LHD 100 to move across larger distances, while still remaining connected to the overhead power structure 1. For example, the trailing cable 110 is long enough for the LHD 100 to reach into other entries far enough to load ore, or perform other required tasks, while staying connected to the overhead power grid 1 and not getting tangled up in itself. The cable reel 130 may be attached anywhere on the LHD or Haul Truck, such as the front side shown in FIG. 2C. The cable 110 is fed from the reel 130 through a vertical extension conduit 131 coupled to the cable reel 130. An upper portion of the conduit 131 is secured to the connector 120, preferably at a height approximately slightly below that of the conductors 2 and rail segments 3 of the overhead power structure 1 to minimize interference of the trailing cable 110 with other components or operators of the LHD 110. However, the conduit 131 may have other heights as desired for various operations.

As discussed above, the LHD 100 connects to the power structure 1 via the trolley 10 that runs along the rail segments 3 and that commutates with the power structure 1. As shown in FIGS. 3A-3B, the trolley 10 includes a base 12 that runs below and generally parallel to the overhead power structure 1. Two flanges 13 rise upwards from respective lateral sides of the base 12 on the outside of the rail segments 3. A pair of spaced upper guide wheels 11a and a lower guide wheel 11b are secured to an inner side of each flange 13. However, the number and spacing of the upper 11a and lower 11b guide wheels may be varied. The lower guide wheels 11b cooperate with the upper guide wheels 11a to "squeeze" the rail segments 3 to ensure the trolley 10 remains properly balanced on the rail segments 3 and so that commutators 15 (further discussed below) remain properly aligned with the conductors 2.

With continued reference to FIGS. 3A and 3B, the trolley includes commutators 15 that connect to the grid conductors 2 via a commutation material such as graphite. The trailing cable 110 then connects the commutators 15 to the LHD 100. The commutators 15 may include a grounding circuit from the LHD 100, that extends through ground leads in the trailing cable 110, and then through the trolley wheels 11 that ride on the outer rails 3 of the overhead grid 1. A "universal joint" swivel 16 is disposed on the base 12 of the trolley 10 and a cable clamp 17 is used to secure the trailing cable 110 to the trolley 10. The trailing cable 110 hangs down from the clamp 17 and connects to the connector 120 mounted on the LHD 100.

Figure 4:
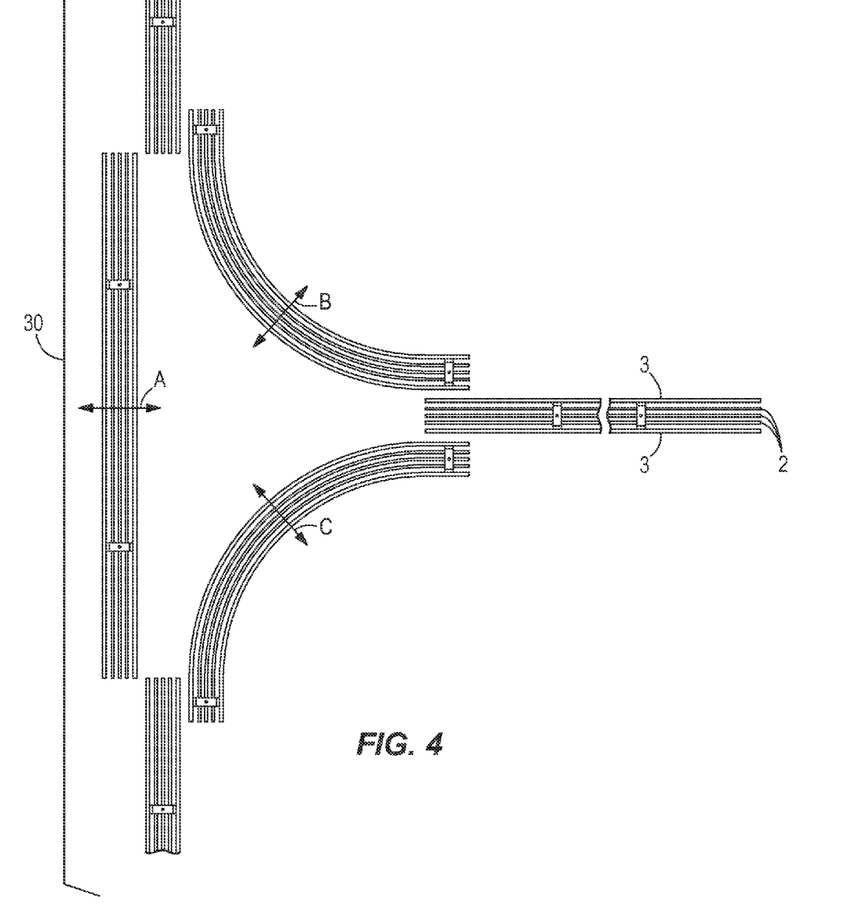
FIG. 4 is an exploded plan view of the overhead power grid.
Figure 5:
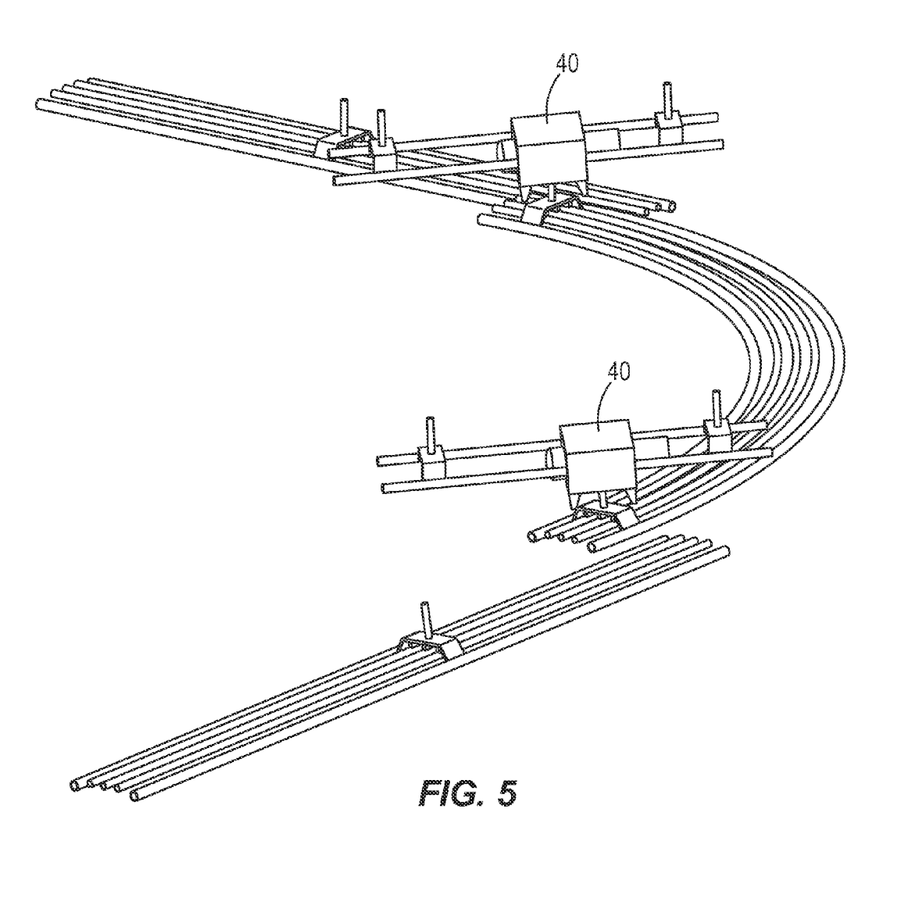
FIG. 5 is a perspective view of the overhead power grid including a switching mechanism.
Figure 6:
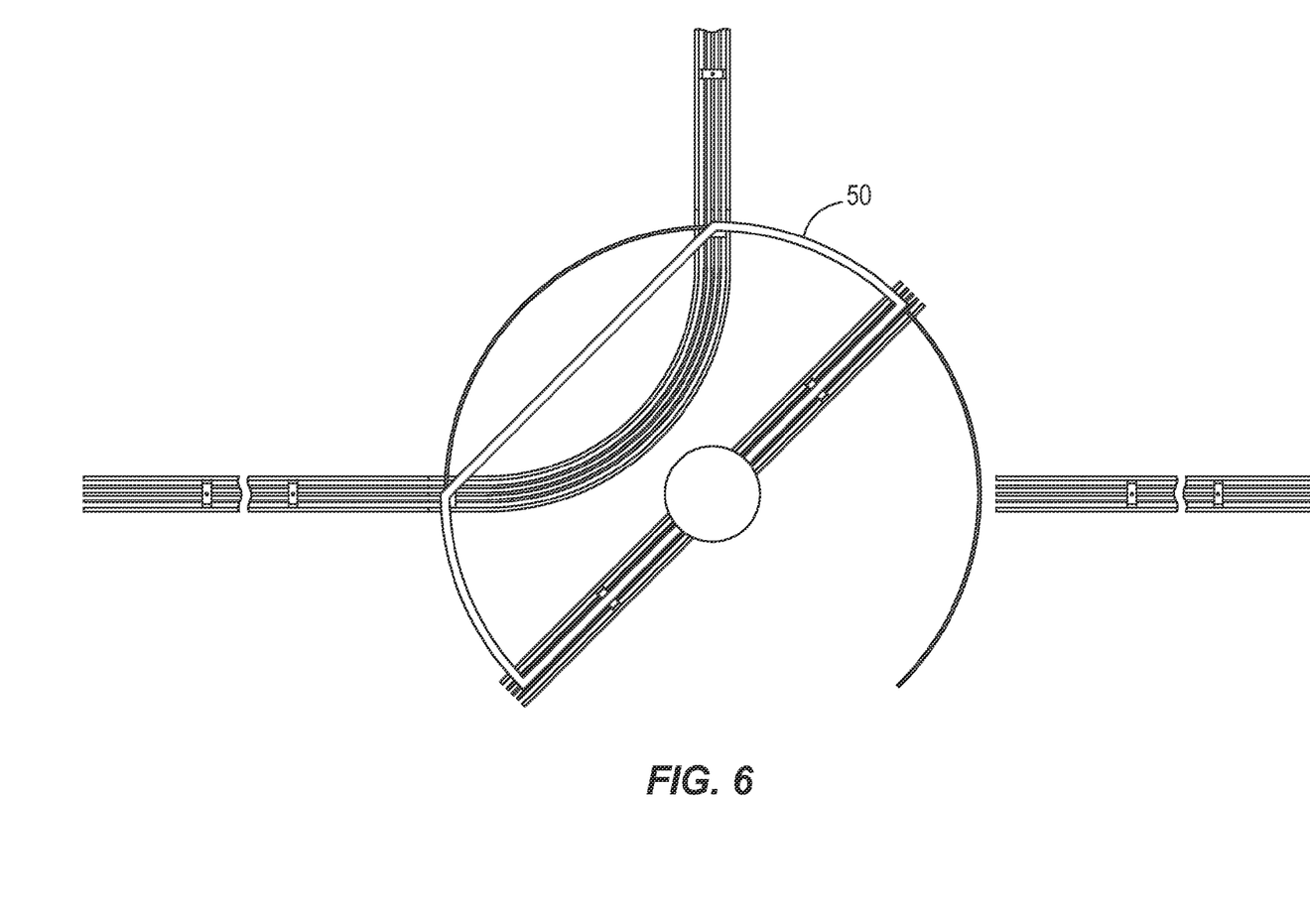
FIG. 6 is an overhead plan view of an alternative embodiment of the overhead power grid in a turning configuration.
Figure 7:
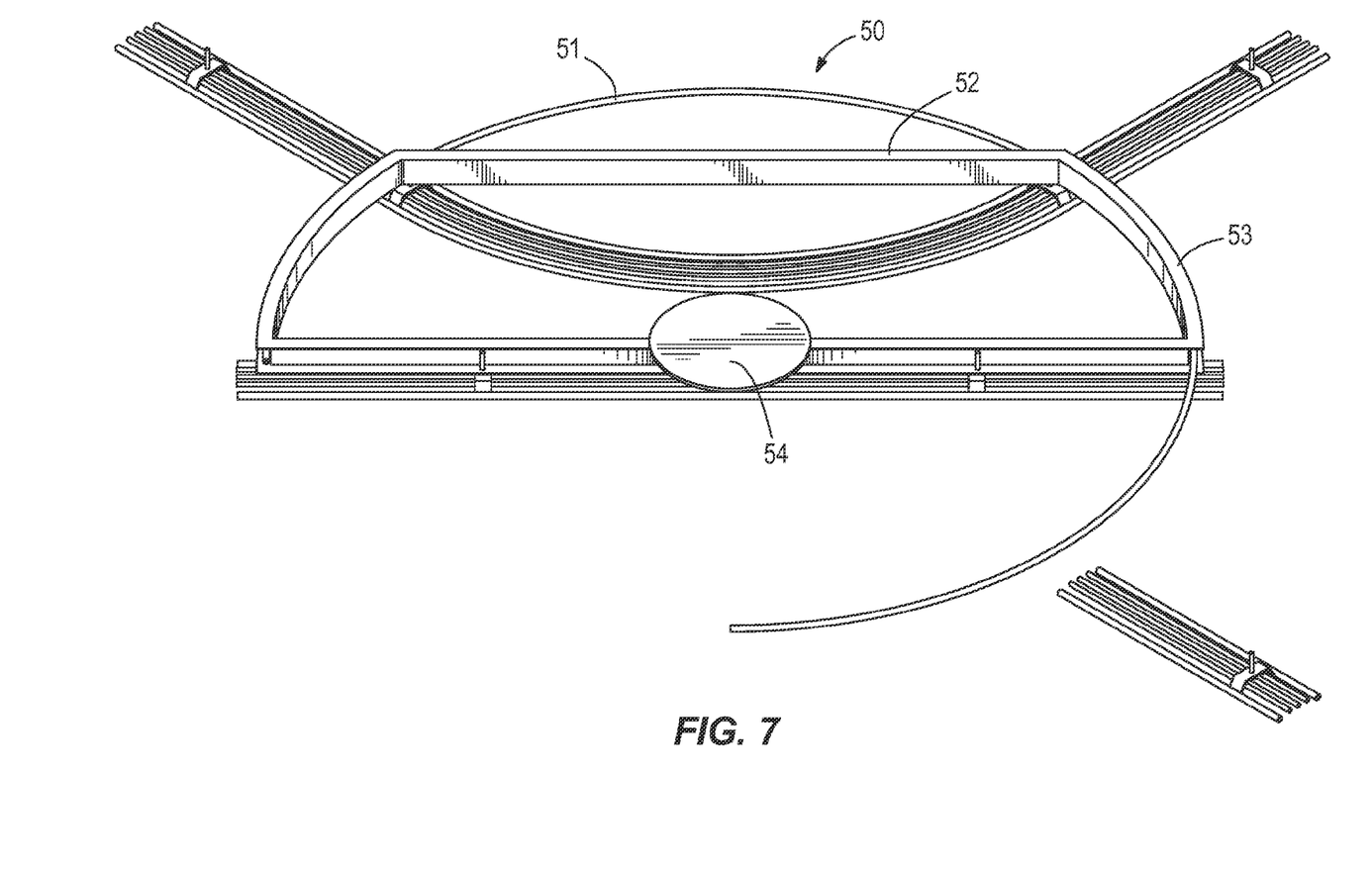
FIG. 7 is a perspective view of FIG. 6.

As shown in FIGS. 4 and 5, embodiments of the present invention also include a switch device 30 to allow movement from one mine entry to another. With reference to the plan view of FIG. 4, because the overhead grid segments 2, 3 include multiple conductors 2 (three are shown in FIG. 4) in between two outer tubular rail segments 3, the segments A, B, C may be mechanically moved into place. Segment A is slidable to the right and left in the direction of the arrows shown in the drawing in the plan view of FIG. 4 to create a straight portion of the switch 30. Segments B and C slide back and forth "over" the main track lines at a 45 degree angle (in the direction of the corresponding arrows shown in the drawing) and then drop down into position to form a right or left turn as the trolley 10 approaches from the right in FIG. 4.

In the embodiment shown in FIG. 5, movements are carried out by a winch 40 that lowers the individual segments into place. However, the movements of the segments can be carried out with slides, cams, linear actuators, belts, or other devices known in the art. A controller (not shown) may be utilized to electronically control the mechanical actuation of the segments A, B, C. A device similar to the switch device 30 could be utilized for the LHD 100 to pass another mining machine, provided enough room exists in an underground or surface passageway.

In an alternative embodiment, instead of having a separate mechanism for the respective segments of track to be switched into place, a turntable 50, shown in FIGS. 6-9, performs the switching of the pieces of track. The turntable 50 includes a generally circular outer ring 51 and a support member 52 connected to and extending between the ring 51. The support member 52 connects the ring 51 to a straight rail segment and/or a curved rail segment. The support member 52 shown in FIGS. 6-9 has a generally rectangular shape, with arc-shaped longitudinal end sides 53, the arc-shaped end sides 53 mating with the ring 51. The support member 52 includes a base member 54 disposed thereon so that the turntable 50 may be suspended from a ceiling.

Figure 8:
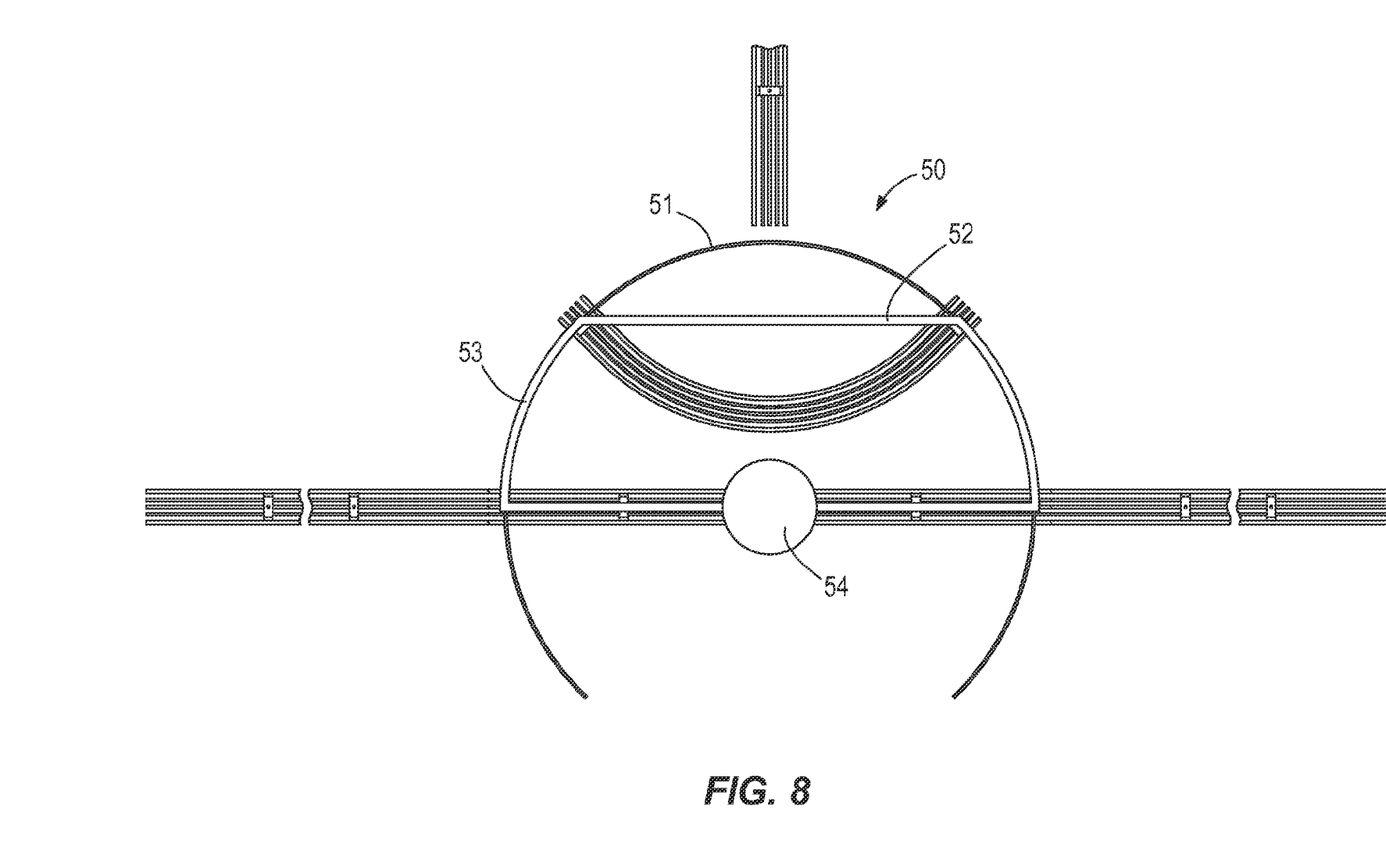
FIG. 8 is an overhead plan view of the alternative embodiment of the overhead power grid of FIG. 6 in a straight configuration.
Figure 9:
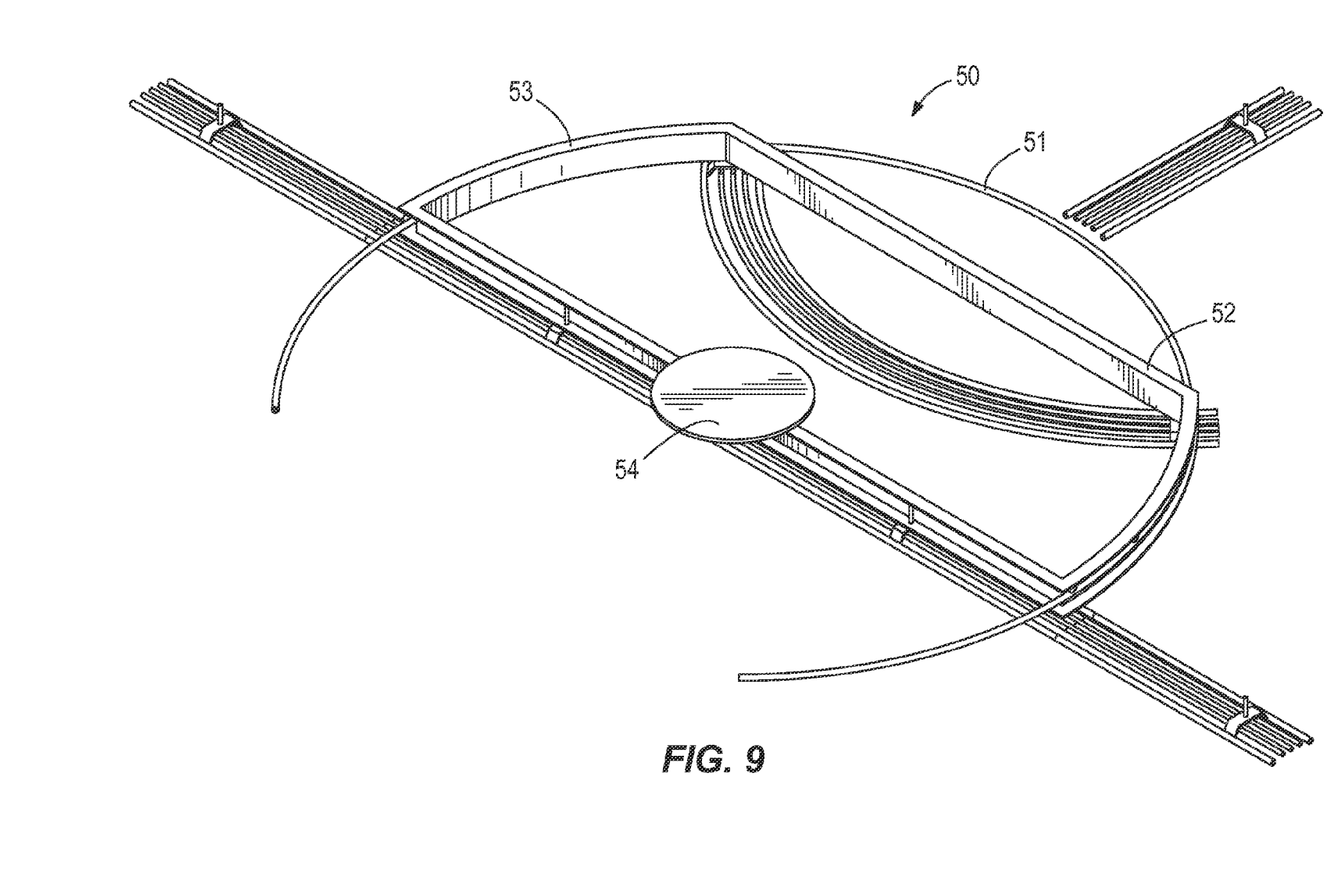
FIG. 9 is a perspective view of FIG. 8.

The turntable 50 is rotatable to align either the curved rail segment in order for the LHD 100 to make a right or left turn (FIGS. 6-7) or to align the straight rail segment with the fixed portions of the track in order for the LHD 100 to move straight (FIGS. 8-9). The turntable 50 could be modified to be used in a 4-way intersection, if necessary. A controller (not shown) having a motor position sensor or the like may be used to control rotation of the turntable.

In operation, as the LHD 100 moves along entryways in an underground mine, or along dedicated roadways on a surface mine, the trailing cable 110 pulls the trolley 10 along the overhead power grid system 1, thus maintaining connectivity to the power grid 20. The LHD 100 can move about and turn completely around in a circle without the trailing cable 110 binding or touching the ground. The connection to the mining machine 100 includes a "breakaway" connector 120 in case the LHD 100 tries to move further than a maximum distance the trailing cable 110 will allow. The mobile mining machine 100 would then be able to move about the entries in an underground mine by "towing" its trolley 10 behind, while drawing power from the overhead grid structure 1.

The overhead power grid 1 for mobile mining machines 100 according to embodiments of the present invention utilizes electric-powered mining machines 100 in surface and underground mines without the use of ground-engaging trailing cables and/or cable reels. The typical trailing cable with a cable reel wears out quickly and hinders the passage of multiple cable-reel powered machines (which cannot drive over energized cables). The overhead grid system 1 eliminates this gridlock scenario by providing switches 30 and intersections where machines may pass each other. For instance, if two LHD's 100 approach the intersection depicted in FIG. 3, one from the bottom of the figure and one from the right side of the figure, and both attempt to head towards the top of the figure, one of the LHD's 100 can stop, wait for the other to pass through the intersection, and then continue behind the first. If these mining vehicles used "lay-down" trailing cables via a machine-mounted cable reel, the second LHD 100 would have to wait for the first 100 to return and pass back through the switch in the direction it originally came from before the second LHD 100 could proceed towards a position at the top of the figure.

The overhead power grid 1 for mobile mining machines 100 offers significant health and safety advantages over diesel power machines by reducing or totally eliminating the dependence on diesel power, as all of the machines connected to the grid would be electrically powered, for example, via a Variable Frequency Drive (VFD) and/or a Switched Reluctance Drive (SRD). Utilizing these electronic drive technologies in conjunction with the overhead power grid 1 also offers the advantage of greater power when needed and the ability to "regenerate" braking power back into the grid, thus optimizing energy efficiencies. Regeneration is the process of using the electric wheel motors as generators to convert the energy of deceleration (braking) and turn it back into the same voltage and frequency to pump it back on the grid 1.

Although the invention has been described in detail with reference to certain preferred embodiments, variations and modifications exist within the scope and spirit of one or more independent aspects of the invention as described.

The invention claimed is:

1. A vehicle configured to connect to an overhead power structure, the vehicle comprising:
    a chassis; and
    a cable connected to the chassis and configured to mechanically and electrically connect the chassis to the overhead power structure; and
    a connector coupled to the chassis and rotatable 360 degrees relative to the chassis, the connector includes a socket for releasable securing an end of the cable, wherein the connector releases the end of the cable when a force exerted on the cable exceeds a predetermined amount.

2. The vehicle of claim 1, wherein the vehicle is a mining vehicle.

3. The vehicle of claim 1, wherein the vehicle is a load haul dump vehicle.

4. The vehicle of claim 1, wherein the connector includes a spring-loaded ball that works in a detent to hold the connector in a socket of the chassis.

5. The vehicle of claim 1, further comprising a conduit coupled to the cable reel at one end and coupled to the connector at an opposite end.

6. The vehicle of claim 5, wherein the conduit is generally vertical.

7. An overhead power structure for a vehicle, the overhead power structure comprising:
    a trolley;
    a plurality of generally tubular and parallel segments forming a track along which the trolley runs;
    a power source connected to the tubular segments;
    a cable connected to the trolley and configured to attach to a vehicle moving on a surface, the cable mechanically and electrically connecting the vehicle to the trolley;
    a sensor measuring a characteristic of the cable and creating a first signal indicative of the characteristic of the cable; and
    a controller operable to receive the first signal and, when the first signal exceeds a predetermined threshold, interrupt electrical communication between the cable and the vehicle.

8. The overhead power structure of claim 7, wherein outer tubular segments are rail segments along which guide wheels of the trolley run.

9. The overhead power structure of claim 8, wherein the trolley includes a base that runs below and generally parallel to the overhead power structure.

10. The overhead power structure of claim 9, wherein two flanges rise upwards from respective lateral sides of the base on the outside of the rail segments.

11. The overhead power structure of claim 8, wherein at least one of the guide wheels runs along an upper portion of the outer tubular segments and at least one of the guide wheels runs along a lower portion of the outer tubular segments.

12. The overhead power structure of claim 7, wherein inner tubular segments are conductor tubes that form conductors for a power grid.

13. The overhead power structure of claim 7, wherein the power grid is a 3-phase AC power grid.

14. The overhead power structure of claim 7, further comprising a switch to change direction of a portion of the track.

15. The overhead power structure of claim 7, further comprising a turntable to change direction of a portion of the track.

16. The overhead power structure of claim 15, wherein the turntable includes a plurality of portions of the track and is turnable to change the direction of the track corresponding to a selected one of the portions of the track.

17. The overhead power structure of claim 7, wherein the characteristic is an angle of the cable relative to the chassis.

18. The overhead power structure of claim 7, wherein the characteristic is an amount of tension in the cable.

19. The overhead power structure of claim 7, further including a cable reel, the cable being wrapped onto or reeled out from the cable reel.

20. The overhead power structure of claim 19, wherein the control device activates the cable reel to do at least one of reeling in the cable or paying out the cable in response to the first signal.

21. The overhead power structure of claim 19, wherein the cable reel includes a ripcord that is activated when a maximum length has been paid out from the cable reel, wherein activation of the ripcord causes the controller to perform at least one of alerting a vehicle operator to modify a speed of the vehicle and de-energizing the cable.

22. The overhead power structure of claim 7, wherein the control device de-energizes the cable when the first signal exceeds a predetermined threshold.

23. The overhead power structure of claim 7, wherein the control device disconnects the cable from a vehicle when the first signal exceeds a predetermined threshold.

24. The overhead power structure of claim 7, wherein the control device includes at least one of a circuit breaker, a control transformer, a contractor, a ground fault interrupter, and a logic controller.

* * * * *